April 20, 1937.  H. C. DRAKE  2,077,380
RAIL FLAW DETECTOR MECHANISM
Filed March 7, 1935
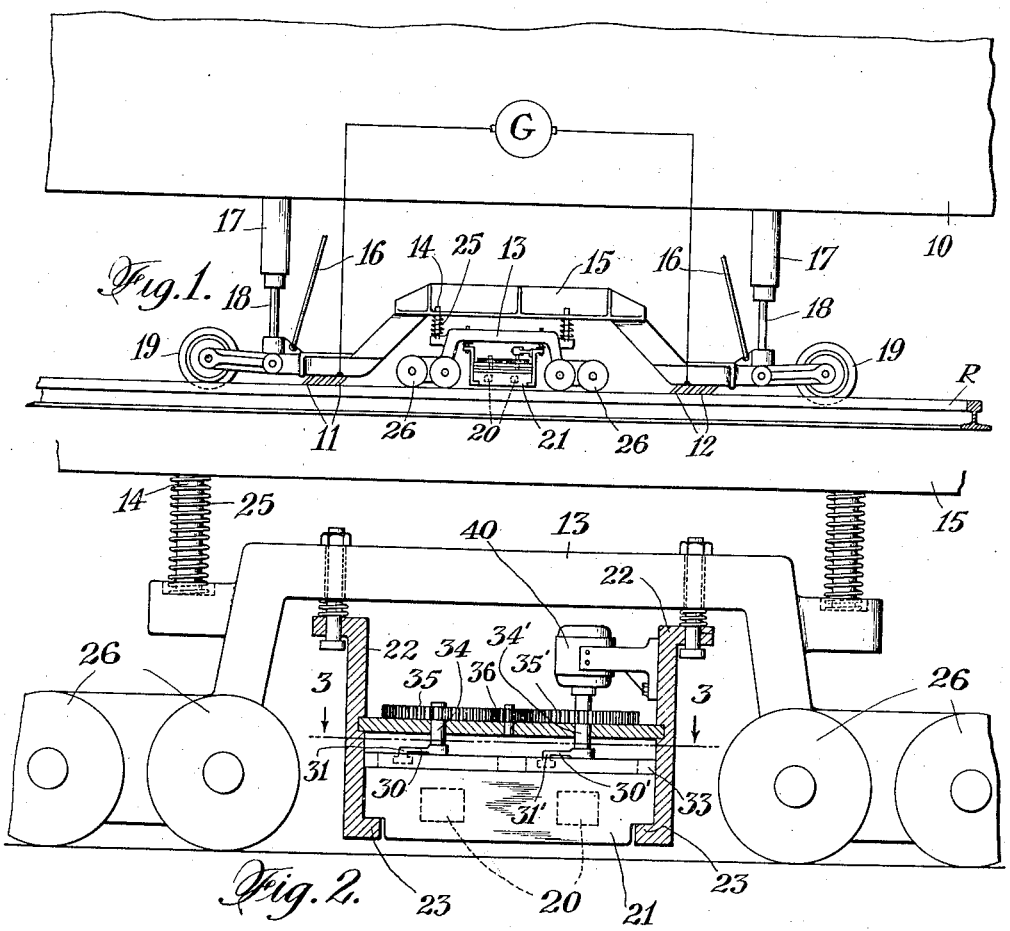
Fig.1.
Fig.2.
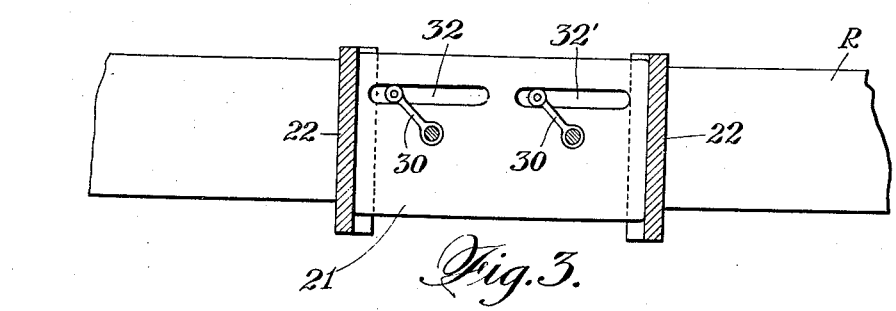
Fig.3.
Inventor
Harcourt C. Drake
By Joseph H. Lipschutz
Attorney Patented Apr. 20, 1937

2,077,380

UNITED STATES PATENT OFFICE 2,077,380

RAIL FLAW DETECTOR MECHANISM

Harcourt C. Drake, Hempstead, N. Y., assignor to Sperry Products, Inc., Brooklyn, N. Y., a corporation of New York Application March 7, 1935, Serial No. 9,751

11 Claims. (Cl. 175—183)

This invention relates to rail flaw detector mechanisms and is designed to be employed in the Sperry rail flaw detector cars. The general principle underlying the operation of these cars is well known and consists in energizing the rail by passing current therethrough to establish an electromagnetic field surrounding the same and then exploring said field for irregularities caused by the presence of flaws within the rail. Such irregularities are detected by inductive means which generate an E. M. F. which after being suitably amplified is caused to operate a recorder pen on the chart and at the same time discharge paint on the rail at the point of flaw.

The inductive means which was employed originally in the Sperry cars consisted of two coils connected in opposition and arranged in tandem along the rail. It was found, however, that when these coils were positioned centrally with respect to the rail head, fissures were frequently missed because of the fact that centrally located fissures caused a diminution of flux in one part of the railhead and an increase in flux at other points across the railhead, but the sum total of flux remained the same and therefore did not affect the coils. It was also found that if the pair of coils was positioned nearer the gauge side of the railhead they would miss fissures nearer the outside of the railhead; while if the pair of coils was positioned nearer the outside of the railhead they would miss fissures near the gauge side. To obviate this condition the Sperry cars were improved to provide two pairs of coils in staggered relation positioned one pair nearer the gauge side and the other pair nearer the outside of the railhead. Thus, every part of the rail was subject to detection for flaws.

It is the principal object of my invention to provide a structure for the detector means which consists of only a single pair of coils but which is capable of performing the function of the plurality of pairs of coils in that it will test every part of the railhead in succession.

Further objects and advantages of this invention will become apparent in the following detailed description thereof.

In the accompanying drawing,

Fig. 1 is a side elevation of a portion of a Sperry rail flaw detector car having my invention applied thereto.

Fig. 2 is a side elevation showing the detector mechanism enlarged.

Fig. 3 is a section taken substantially on the line 3—3 of Fig. 2 and showing a plan view of the novel mechanism.

Referring to Fig. 1 of the drawing, there is disclosed a portion of a Sperry rail flaw detector car comprising the car body 10 within which is mounted the generator G adapted to supply current to the rail R to establish an electromagnetic field surrounding the same. The current from generator G may be passed into and out of the rail by means of sets of brushes 11 and 12 carried by a current brush carriage 15, said carriage being supported from the car body by means such as cables 16 and springs, not shown, which normally maintain the current brush carriage in raised or ineffective position. When it is desired to lower such carriage into engagement with the rail, fluid pressure such as compressed air is supplied to cylinders 17 to depress piston-rods 18, said piston-rods being connected to the current brush carriage so that said carriage is lowered against the action of the retractile springs. The current brush carriage may be adapted to ride along the rails on means such as flanged wheels 19.

The electromagnetic field surrounding the rail is uniform as long as there are no flaws. When flaws occur there is a distortion of the electromagnetic field in the region of flaw and such distortions are designed to be detected by induction means, which in the present case comprise a pair of opposed induction coils 20 supported in the housing 21. Said housing may in turn be supported on a carriage 13 by means of depending brackets 22 having shoulders 23. Said carriage 13 may be supported on the current-brush carriage 15 for movement independent thereof by means such as springs 25 and bolts 14 fitting loosely in carriage 15. Said carriage 13 may be supported on the rail surface by means of wheels 26 which will maintain the coils 20 at a constant distance above the rail.

As stated in the introduction, a single pair of induction coils 20 arranged in tandem with respect to the rail would not be effective to detect fissures in all parts of the railhead since if the coils were long enough to extend substantially across the entire railhead they would fail to detect centrally located fissures because the flux diminution at one point is compensated for by the flux increase at other points across the railhead, and the said coils 20 would integrate the flux so that the total flux would remain unchanged and therefore the centrally located flaws would not be detected. On the other hand, if the coils were made short enough and caused to cooperate with the gauge side or the outside of the railhead they would fail to detect fissures at the other side from the one which they are testing. These difficulties can be solved by two pairs of coils, one nearer the gauge side and one nearer the outside, but I accomplish the same purpose by a single pair of coils of relatively short length so as to extend across only a fraction of the railhead and then moving said coils rapidly in an oscillatory path back and forth across the railhead.

For the above purpose I provide means for sliding the housing 21 in which the coils are located, back and forth across the railhead, and to accomplish this result the housing 21 is slidable on the shoulders 23 which extend laterally across the entire railhead. The oscillation of housing 21 relative to the railhead may be by any suitable means such as crank arms 30 and 30' having pins 31, 31' extending into elongated slots 32, 32' in a plate 33 fixed to the upper surface of housing 21. Said crank arms 30 and 30' may be simultaneously rotated in similar positions by means such as gears 35, 35' fixed to the vertical arms 34, 34' integral with said crank arms 30 and 30'. Said gears 35 and 35' mesh with an idler 36 whereby the gears 35 and 35' will be caused to rotate in the same direction that either of shafts 34 or 34' is rotated. I have shown the shaft 34' rotated by means of a motor 40 which may be supported on the respective bracket 22 carried by the current brush carriage 15. Since the parts 30, 31, 32, 34, 35 are exactly the same as parts 30', 31', 32', 34', 35', the said crank arms 30 and 30' will be moved at the same rate and to the same extent and in the same rotary position to cause the housing 21 to be oscillated back and forth on shoulders 23 between brackets 22.

Thus it will be seen that as the car travels along the rail the motor 40, which may be energized from any suitable source such as generator G or batteries within the car, and rotating at constant speed, will cause the pair of coils 20 to coact successively with every portion of the railhead, from the gauge side to the outside and back, continuously.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a rail flaw detector car adapted to move along the rails, means including a source of current supply and a current brush carriage adapted to engage the rail for supplying current to the rail, a flaw detector carriage supported on said current brush carriage for movement relative to said current brush carriage and laterally with respect to the rail head, flaw responsive means carried by said flaw detector carriage, and means for periodically moving said flaw detector carriage relative to said current brush carriage and laterally of the rail head.

2. In a rail flaw detector car adapted to move along the rails, means including a source of current supply and a current brush carriage adapted to engage the rail for supplying current to the rail, a flaw detector carriage supported on said current brush carriage for movement relative to said current brush carriage and laterally with respect to the rail head, flaw responsive means carried by said flaw detector carriage, and means for oscillating said flaw detector carriage relative to said current brush carriage and laterally of the rail head.

3. In a rail flaw detector car adapted to move along the rails, means including a source of current supply and a current brush carriage adapted to engage the rail for supplying current to the rail, a flaw detector carriage supported on said current brush carriage for movement relative to said current brush carriage and laterally with respect to the rail head, flaw responsive means carried by said flaw detector carriage, and means for continuously oscillating said flaw detector carriage relative to said current brush carriage and laterally of the rail head.

4. In a rail flaw detector car adapted to move along the rails, means including a source of current supply and a current brush carriage adapted to engage the rail for supplying current to the rail, a flaw detector carriage supported on said current brush carriage for movement relative to said current brush carriage and laterally with respect to the rail head, flaw responsive means carried by said flaw detector carriage, and means carried by said current brush carriage for periodically moving said flaw detector carriage relative to said current brush carriage and laterally of the rail head.

5. In a rail flaw detector car adapted to move along the rails, means including a source of current supply and a current brush carriage adapted to engage the rail for supplying current to the rail, a flaw detector carriage supported on said current brush carriage for movement relative to said current brush carriage and laterally with respect to the rail head, flaw responsive means carried by said flaw detector carriage, and means carried by said current brush carriage for oscillating said flaw detector carriage relative to said current brush carriage and laterally of the rail head.

6. In a rail flaw detector car adapted to move along the rails, means including a source of current supply and a current brush carriage adapted to engage the rail for supplying current to the rail, a flaw detector carriage supported on said current brush carriage for movement relative to said current brush carriage and laterally with respect to the rail head, flaw responsive means carried by said flaw detector carriage, and means carried by said current brush carriage for continuously oscillating said flaw detector carriage relative to said current brush carriage and laterally of the rail head.

7. In a rail flaw detector car adapted to move along the rails, flaw responsive means, a support for said flaw responsive means, and means for oscillating said support and said flaw responsive means laterally with respect to the rail head.

8. In a rail flaw detector car adapted to move along the rails, flaw responsive means, a support for said flaw responsive means, and means for continuously oscillating said support and said flaw responsive means laterally with respect to the rail head.

9. In a rail flaw detector car adapted to move along the rails, flaw responsive means which cooperates with only a portion of the rail head width at any given time, a support for said flaw responsive means, and means for moving said support and said flaw responsive means laterally to cause said flaw responsive means to cooperate with substantially all portions of the rail head width successively.

10. In a rail flaw detector car adapted to move along the rails, flaw responsive means which cooperates with only a portion of the rail head width at any given time, a support for said flaw responsive means, and means for oscillating said support and said flaw responsive means laterally to cause said flaw responsive means to cooperate with substantially all portions of the rail head width successively.

11. In a rail flaw detector car adapted to move along the rails, flaw responsive means which cooperates with only a portion of the rail head width at any given time, a support for said flaw responsive means, and means for continuously oscillating said support and said flaw responsive means laterally to cause said flaw responsive means to cooperate with substantially all portions of the rail head width successively.

HARCOURT C. DRAKE.